United States Patent
Kanasaki et al.

(10) Patent No.: US 8,301,095 B2
(45) Date of Patent: Oct. 30, 2012

(54) PORTABLE WIRELESS DEVICE

(75) Inventors: Yoshihiro Kanasaki, Sendai (JP); Haruhiko Kakitsu, Sendai (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/681,077

(22) PCT Filed: Feb. 23, 2009

(86) PCT No.: PCT/JP2009/000769
§ 371 (c)(1), (2), (4) Date: Mar. 31, 2010

(87) PCT Pub. No.: WO2010/013367
PCT Pub. Date: Feb. 4, 2010

(65) Prior Publication Data
US 2010/0216419 A1 Aug. 26, 2010

(30) Foreign Application Priority Data
Jul. 31, 2008 (JP) ................................. 2008-198156

(51) Int. Cl.
*H04B 7/08* (2006.01)
*H04K 3/00* (2006.01)
(52) U.S. Cl. ......... 455/132; 455/303; 333/124; 343/852
(58) Field of Classification Search .......... 455/132–135, 455/303; 333/32, 110, 112, 124; 343/702, 343/852, 860
See application file for complete search history.

(56) References Cited

U.S. PATENT DOCUMENTS

| 7,486,135 | B2 * | 2/2009 | Mu ................................. 330/51 |
| 7,701,397 | B2 * | 4/2010 | Mori et al. .................... 343/702 |
| 2004/0242289 | A1 * | 12/2004 | Jellicoe et al. ............. 455/575.1 |
| 2005/0024288 | A1 | 2/2005 | Saito |
| 2005/0143151 | A1 | 6/2005 | Ito |

(Continued)

FOREIGN PATENT DOCUMENTS
JP 2002-354073 A 12/2002
(Continued)

OTHER PUBLICATIONS

International Search Report mailed May 26, 2009, in corresponding International Application No. PCT/JP2009/000769, filed Feb. 23, 2009.

*Primary Examiner* — Lee Nguyen
(74) *Attorney, Agent, or Firm* — Seed IP Law Group PLLC

(57) ABSTRACT

A portable wireless device that makes it possible to maintain any desired matching state and can suppress an increase in the loss accompanying matching if the impedance characteristic of an antenna changes with expansion/storage of the antenna, deformation of a housing, etc., is provided.

Two channels of signal paths that can be selected by switch section 11, 15 are provided between an antenna 10 and a reception circuit 16; a first low noise amplifier 13 that can amplify a received high frequency signal is provided in one path and a second low noise amplifier 18 having an impedance characteristic different from the low noise amplifier 13 is provided in the other signal path. The form of the antenna 10 or the form of a housing is detected in a form change detection section 20 and the two channels of signal paths are automatically switched in a control section and two types of impedance matching states are used properly.

19 Claims, 8 Drawing Sheets

U.S. PATENT DOCUMENTS

| | | |
|---|---|---|
| 2005/0215281 A1 | 9/2005 | Oodaira |
| 2007/0052595 A1 | 3/2007 | Harano |
| 2009/0029747 A1 | 1/2009 | Ito |

FOREIGN PATENT DOCUMENTS

| | | |
|---|---|---|
| JP | 2003-309489 A | 10/2003 |
| JP | 2005-51503 A | 2/2005 |
| JP | 2005-175878 A | 6/2005 |
| JP | 2005-176302 A | 6/2005 |
| JP | 2005-244260 A | 9/2005 |
| JP | 2005-286606 A | 10/2005 |
| JP | 2007-104095 A | 4/2007 |

* cited by examiner (a)

(b)

EXPANSION STATE    STORAGE STATE

PORTABLE WIRELESS DEVICE

TECHNICAL FIELD

This invention relates to a portable wireless device having a possibility that it is used in different use modes, such as a mobile telephone terminal, for example, and in particular to an art for connecting an antenna and a wireless circuit.

BACKGROUND ART

For example, in a mobile telephone terminal, often a whip antenna that can be expanded and contracted (or that can be placed in and taken out of a housing) is installed and a wireless circuit, etc., is built in a housing that can be deformed. The housing or metal such as a shield case in the housing may be used as an antenna or an antenna component.

In a mobile telephone terminal installing a whip antenna that can be expanded and contracted, generally a communication function can be used in any of two modes of a storage state in which the antenna is contracted and an expansion state in which the antenna is taken out to the outside and is expanded.

Often, a housing of a mobile telephone terminal is separated into an upper housing and a lower housing, which are connected through a hinge, whereby deformation operation of opening/closing or rotation is possible. Further, in a mobile telephone terminal using a housing, etc., as an antenna, often a communication function using the antenna containing the housing can be used in any of two modes of a state in which the housing is folded to a small size and a state in which the housing is opened to an elongated state.

However, for example, to use the whip antenna that can be expanded and contracted in an expansion state and a storage state, change in the impedance characteristic is not avoided. Likewise, to use the housing, etc., as an antenna, to use in a state in which the housing is closed and to use in a state in which the housing is opened, change in the impedance characteristic of the antenna is not avoided.

When the impedance characteristic of the antenna changes, it becomes impossible to correctly match impedance in a matching circuit placed between the antenna and a wireless circuit and a reflection wave increases in a signal transmission path and the communication characteristic of reception sensitivity, etc., is degraded.

Then, in a conventional mobile telephone terminal, for example, a small helical antenna may be adopted so that the impedance characteristic in the storage state of the antenna does not change as compared with the expansion state.

For example, Patent Document 1 discloses an art wherein matching is switched in response to used frequency band or communication mode in a portable wireless device. Specifically, it discloses an art wherein a parallel resonance circuit is turned on by a switch if necessary and an antenna is put into 2 resonance.

Patent Document 2 discloses an art wherein in an OFDM modulation signal receiver, a plurality of antennas are provided, separate amplifiers are connected to the antennas, signals from the antennas are diversity-combined using a weighting factor calculated based on carrier power to noise power ratio C/N (Carrier to Noise ratio) detected for each antenna channel.

Patent Document 1: Japanese Patent Laid-Open No. 2003-309489

Patent Document 2: Japanese Patent Laid-Open No. 2005-175878

DISCLOSURE OF THE INVENTION

Problems to be solved by the Invention

For example, in a frequency band (800 MHz band) used by a mobile telephone terminal in cellular communications, the wavelength of the frequency band is short and thus a small helical antenna can be easily produced. However, for example, assuming reception of digital TV broadcast (DTV) like one-segment broadcasting, the wavelength of the frequency band used in the broadcast (470 to 770 MHz) is long as compared with cellular communications and thus upsizing of a usable helical antenna is not avoided and the antenna is hard to adopt for a portable wireless device such as a mobile telephone terminal from the viewpoints of design, operability, etc.

On the other hand, as in the related art disclosed in Patent Document 1, if the characteristic of the matching circuit is changed, even if the impedance characteristic of the antenna changes with change in the used frequency band or communication mode, any desired matching state can be maintained. However, even if any desired matching state is maintained and a reflection wave can be suppressed, an increase in the loss caused to occur by the presence of the matching circuit is not avoided and the communication characteristic of reception sensitivity, etc., is also degraded as compared with the design of a matching circuit under the optimum condition.

It is an object of the invention to provide a portable wireless device that makes it possible to maintain any desired matching state and can suppress an increase in the loss accompanying matching if the impedance characteristic of an antenna changes with expansion/storage of the antenna, deformation of a housing, etc., to use a wireless frequency band of a comparatively long wavelength like digital TV broadcast (DTV).

Means for Solving the Problems

A portable wireless device of the invention an antenna that receives a predetermined wireless signal; a reception circuit that performs a predetermined reception processing for a high frequency signal received by the antenna; a first reception system that electrically connects the antenna and the reception circuit; a second reception system that electrically connects the antenna and the reception circuit; a form detection section that detects the form of the antenna or the form of a housing; and switch section that selectively switches so as to connect the first reception system or the second reception system to the antenna based on the detection result of the form detection section, wherein the first reception system includes a first low noise amplifier for amplifying the high frequency signal, and wherein the second reception system includes a second low noise amplifier having a different impedance characteristic from that of the first low noise amplifier, the second low noise amplifier for amplifying the high frequency signal.

According to the portable wireless device, the switch section is controlled based on the detection result of the form detection section and either of the first low noise amplifier and the second low noise amplifier having different impedance characteristics is selectively inserted into the signal path between the antenna and the reception circuit, so that if the impedance characteristic of the antenna changes with expansion/storage of the antenna, deformation of the housing, etc., for example, it is made possible to maintain any desired matching state and suppress an increase in the loss accompanying matching.

The portable wireless device of the invention, as the switch section, includes first switch section placed between the antenna and the first low noise amplifier and the second low noise amplifier for selectively switching so as to connect input of the first low noise amplifier or input of the second low noise amplifier to the antenna based on the detection result of the form detection section and second switch section placed between the first low noise amplifier and the second low noise amplifier and the reception circuit for selectively switching so as to connect output of the first low noise amplifier or output of the second low noise amplifier to input of the reception circuit based on the detection result of the form detection section.

According to the portable wireless device, the first switch section and the second switch section are controlled based on the detection result of the form detection section and either of the first reception path and the second reception path is selected as the signal path between the antenna and the reception circuit, so that if the impedance characteristic of the antenna changes with expansion/storage of the antenna, deformation of the housing, etc., for example, it is made possible to maintain any desired matching state and suppress an increase in the loss accompanying matching.

The portable wireless device of the invention includes a first impedance matching section placed between the first switch section and the first low noise amplifier for matching input impedance of the first low noise amplifier to input impedance of the reception circuit.

According to the portable wireless device, a reflection wave can be suppressed and an increase in the loss accompanying matching can be suppressed more effectively.

A portable wireless device of the invention includes an antenna for receiving a predetermined wireless signal; a reception circuit for performing predetermined reception processing for a high frequency signal received by the antenna; a first reception system for electrically connecting the antenna and the reception circuit; a second reception system for electrically connecting the antenna and the reception circuit; a form detection section for detecting the form of the antenna or the form of a housing; first switch section placed between the antenna and the first reception system and the second reception system for selectively switching so as to connect input of the first reception system or input of the second reception system to the antenna based on the detection result of the form detection section; second switch section placed between the first reception system and the second reception system and the reception circuit for selectively switching so as to connect output of the first reception system or output of the second reception system to input of the reception circuit based on the detection result of the form detection section; and a first impedance matching section placed between the antenna and the first switch section for matching impedance of the antenna to input impedance of the reception circuit, wherein the second reception system includes a second low noise amplifier for amplifying the high frequency signal.

According to the portable wireless device, the first switch section and the second switch section are controlled based on the detection result of the form detection section and either of the first reception path and the second reception path of the signal path between the antenna and the reception circuit is selected, so that if the impedance characteristic of the antenna changes with expansion/storage of the antenna, deformation of the housing, etc., for example, it is made possible to maintain any desired matching state and suppress an increase in the loss accompanying matching. Since impedance matching is performed in a portion closer to the antenna, a reflection wave can be suppressed and an increase in the loss accompanying matching can be suppressed more effectively and further circuit design is also facilitated.

In the portable wireless device of the invention, the first reception system includes a first low noise amplifier having a different impedance characteristic from that of the second low noise amplifier, the first low noise amplifier for amplifying the high frequency signal.

According to the portable wireless device, the high frequency signal from the antenna is amplified, whereby the error occurrence rate at predetermined reception processing time can be decreased.

In the portable wireless device of the invention, the second reception system includes a complex conjugate matching section placed between the first switch section and input of the second low noise amplifier for matching the impedance of the antenna and impedance of the second low noise amplifier to complex conjugate impedance.

According to the portable wireless device, the complex conjugate matching section matches the impedance of the antenna and the input impedance of the second low noise amplifier to the complex conjugate impedance. Thus, if the impedance of the antenna shifts largely from the stipulated impedance (for example, 50Ω) when the antenna is in the storage state or the housing is closed, for example, impedance matching between the antenna and the second low noise amplifier can be realized with a small loss.

In the portable wireless device of the invention, the second reception system includes a second impedance matching section for matching output impedance of the second low noise amplifier to the input impedance of the reception circuit between output of the second low noise amplifier and the second switch section.

According to the portable wireless device, the second impedance matching section matches the impedance between output of the second low noise amplifier and input of the reception circuit, so that the high frequency signal output from the second low noise amplifier can be transmitted to the reception circuit efficiently.

In the portable wireless device of the invention, the first reception system includes a third impedance matching section for matching output impedance of the first low noise amplifier to the input impedance of the reception circuit between output of the first low noise amplifier and the second switch section.

According to the portable wireless device, the third impedance matching section matches the impedance between the output of the first low noise amplifier and the reception circuit, so that the high frequency signal output from the first low noise amplifier can be transmitted to the reception circuit efficiently.

In the portable wireless device of the invention, the form detection section detects either an expansion state or a storage state of the antenna.

According to the portable wireless device, the storage/expansion state of the antenna is detected as the form of the antenna and it is made possible to control so as to match the impedance to any desired impedance with a small loss.

In the portable wireless device of the invention, a first housing and a second housing can be opened and closed, the antenna is a dipole antenna containing at least a part of a first circuit board disposed in the first housing and a part of a second circuit board disposed in the second housing, and the form detection section detects either an open state or a closed state of the housing.

According to the portable wireless device, the open state or the closed state of the housing, etc., is detected as the form of the housing and it is made possible to control so as to match the impedance to any desired impedance with a small loss.

The portable wireless device of the invention further includes a reception state determination section for determining whether or not the reception state is good based on the result of the reception processing, wherein the first switch section and the second switch section switch based on the determination result of the reception state determination section.

According to the portable wireless device, control of switch is executed based on whether or not the reception state in the reception circuit is good as well as the detection result of the form detection section, so that more desirable switch control can be performed. For example, if the length of the antenna drawn out from the housing is not a sufficient length or if the open state of the housing is not sufficient, the state does not become desired matching state in the two types of selection states; however, the state of the actually good reception state is selected preferentially, whereby desirable reception state is obtained.

In the portable wireless device of the invention, the predetermined wireless signal is a digital TV broadcast signal.

According to the portable wireless device, any desired matching state can be maintained and an increase in the loss accompanying matching can be suppressed, so that it is made possible to view digital TV broadcast of high image quality.

ADVANTAGES OF THE INVENTION

According to the invention, if the impedance characteristic of the antenna changes with form change of expansion/storage of the antenna, deformation of the housing, etc., for example, it is made possible to maintain any desired matching state and suppress an increase in the loss accompanying matching.

DESCRIPTION OF REFERENCE NUMERALS

Figure 1:
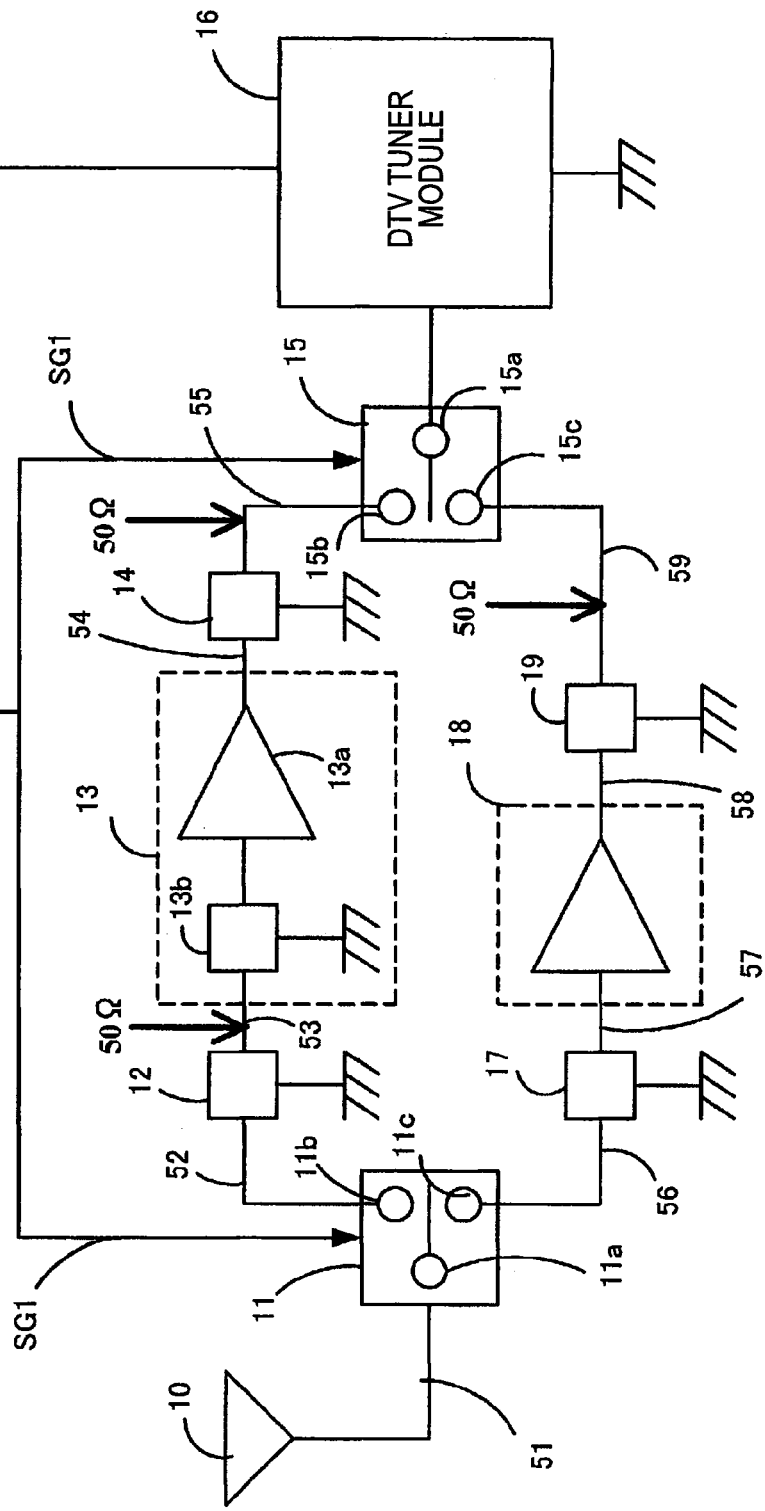
FIG. 1 is a block diagram to show the configuration of the main part of an electric circuit of a portable wireless device in a first embodiment of the invention.

1, 1B, 1C, 1D Portable wireless device
10, 10B Antenna
11 Input path changeover switch
12, 12B, 14, 19 Impedance matching section
13, 18 Low noise amplifier
13a Low noise amplification circuit
13b Impedance matching section
15 Output path changeover switch
16 DTV tuner module
17, 17B Complex conjugate matching section
20, 20B Form change detection section
21 Control section
31, 32 Impedance characteristic
44, 45, 46 Impedance characteristic
51-59 Line
61 First line
62 Second line
102, 103 Metal hinge member
104 Upper housing
105 Lower housing
106 Hinge part
107, 112 Circuit board
108, 109, 115 Feeding section
110, 111, 114 Antenna element
113 Connection cable

BEST MODE FOR CARRYING OUT THE INVENTION

Portable wireless devices of embodiments of the invention will be discussed below with reference to the accompanying drawings:

First Embodiment

Figure 2:
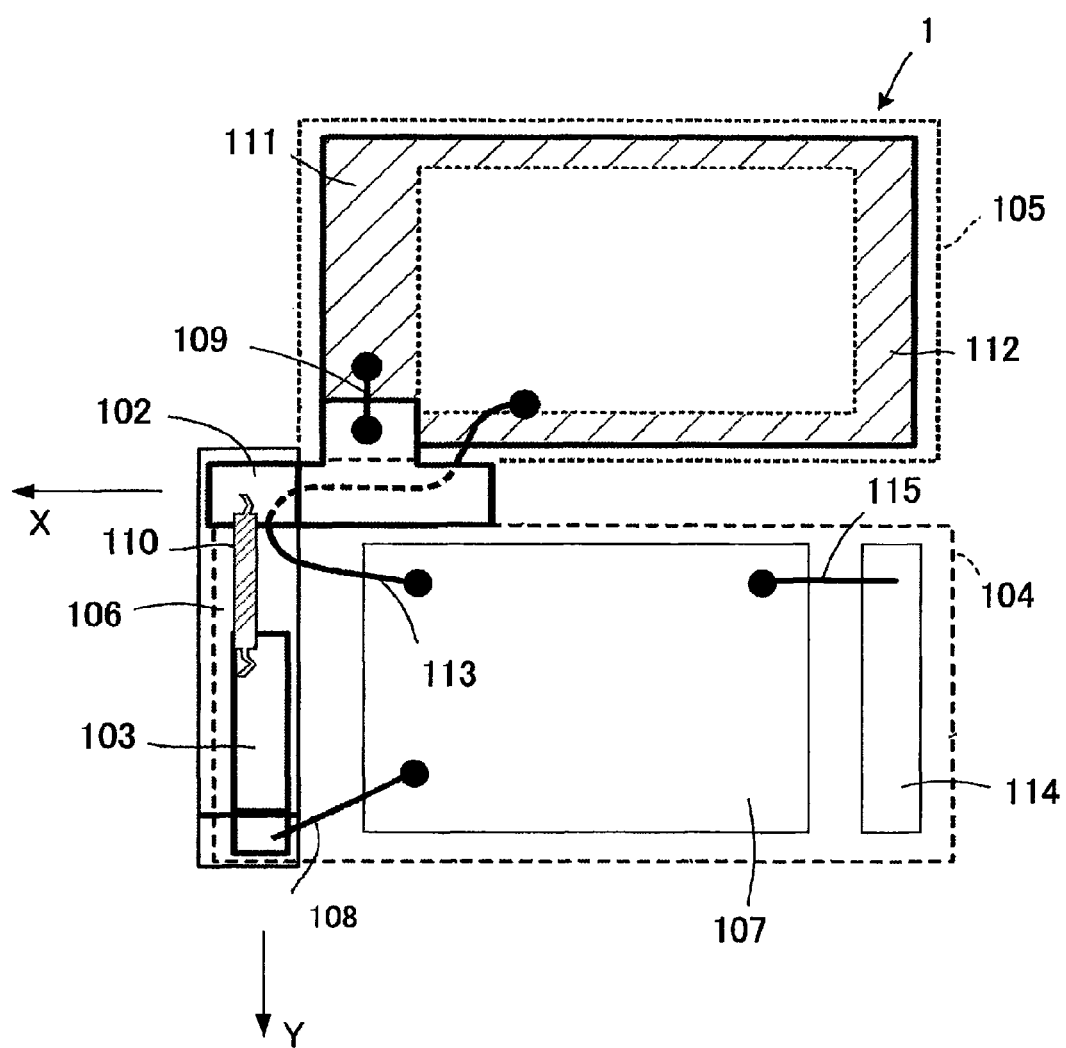
FIG. 2 is a front view in a lateral spread state of a housing to show the physical configuration of the portable wireless device in the first embodiment of the invention.
Figure 3:
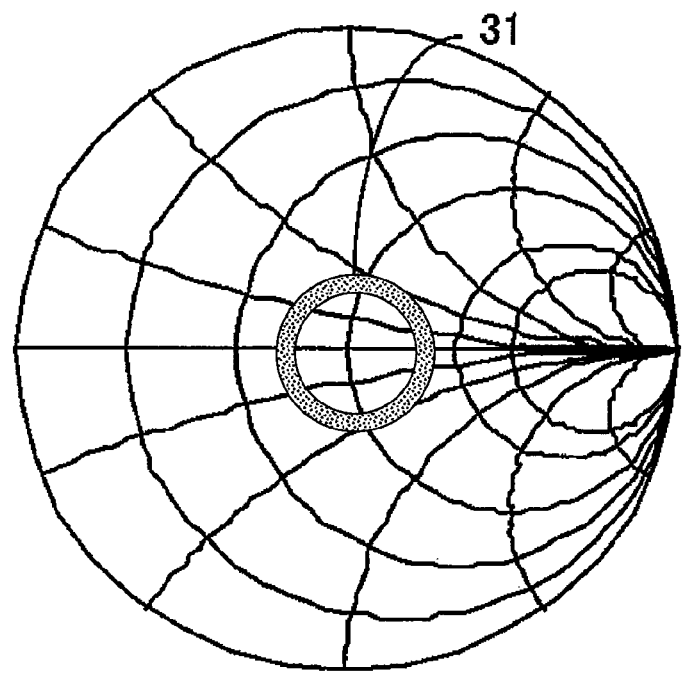
FIG. 3 is a Smith chart to represent an example of the impedance characteristic in a specific part of the portable wireless device in the first embodiment of the invention.
Figure 4:
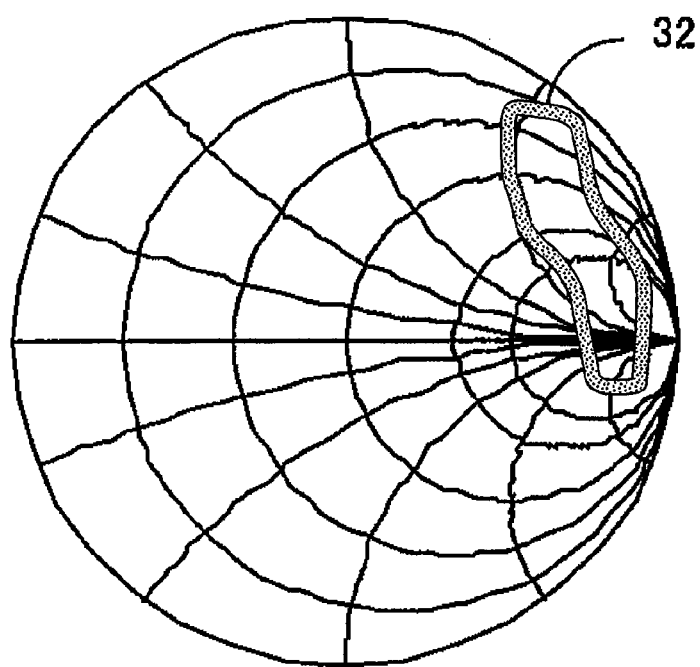
FIG. 4 is a Smith chart to represent an example of the impedance characteristic in a specific part of the portable wireless device in the first embodiment of the invention.
Figure 5:
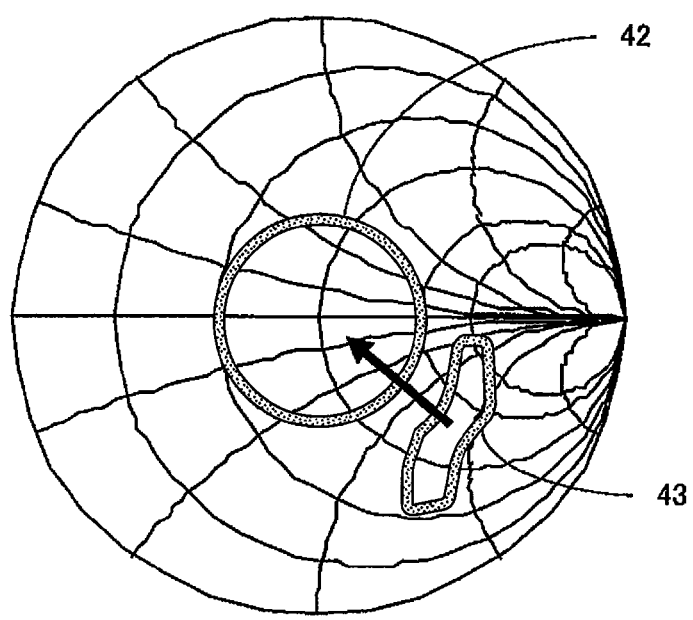
FIG. 5 is a Smith chart to represent an example of the characteristic concerning impedance matching in a specific part of the portable wireless device in the first embodiment of the invention.
Figure 5:
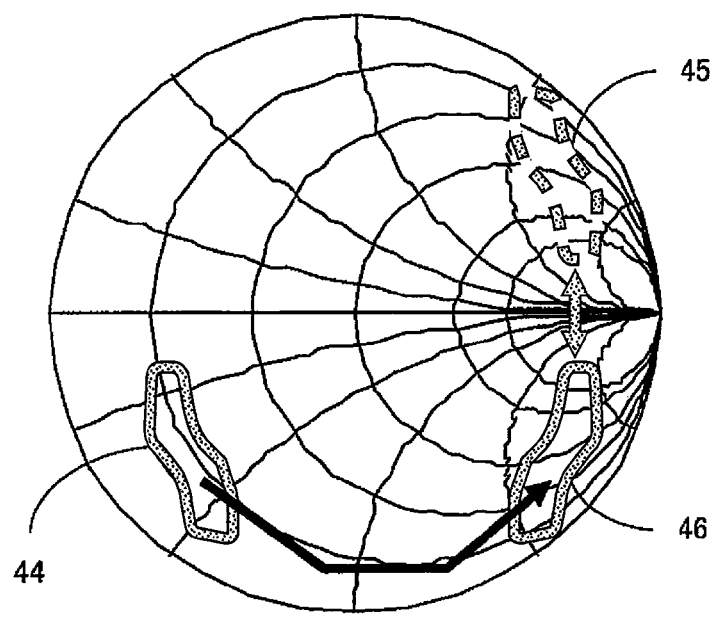
Figure 6:
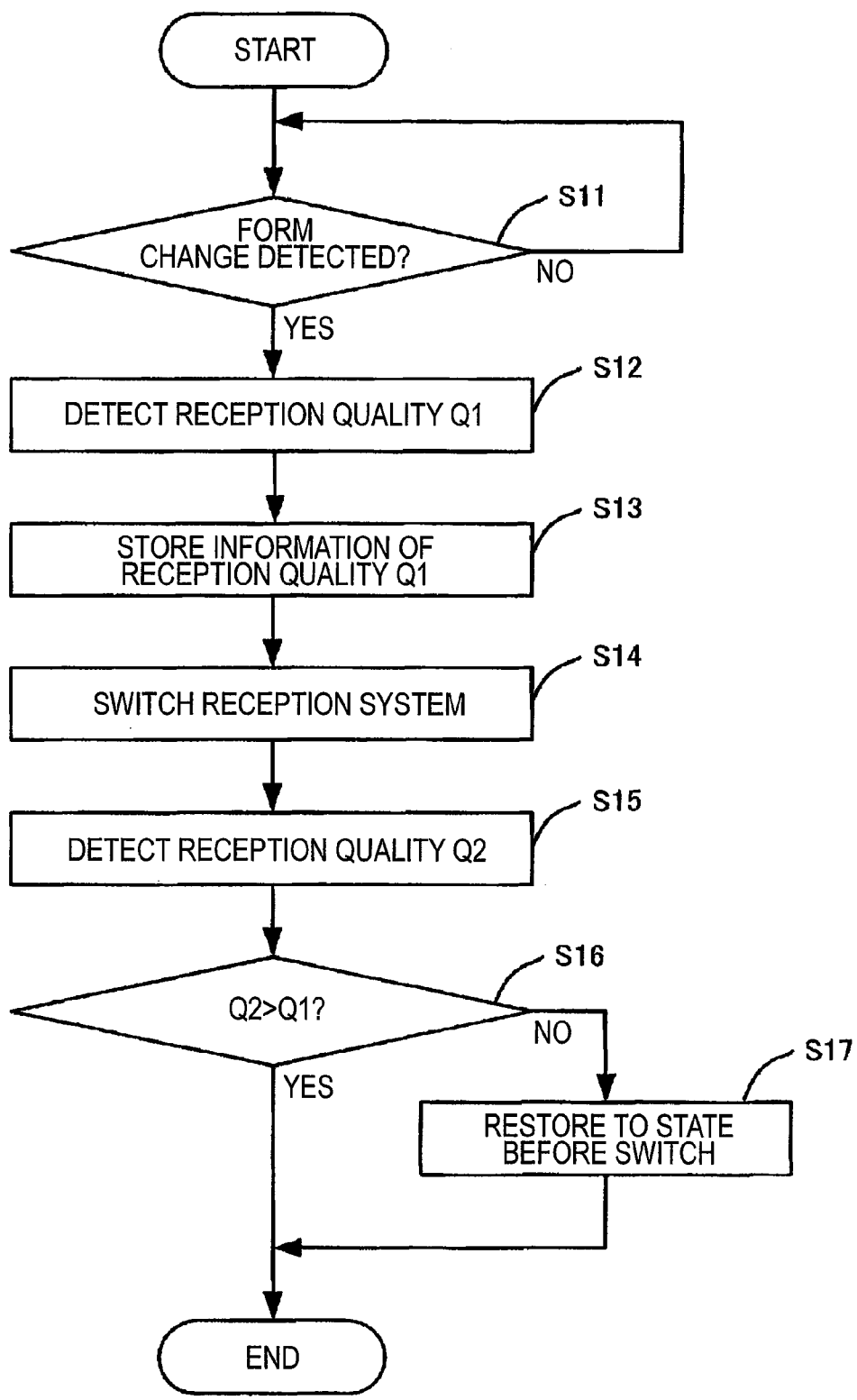
FIG. 6 is a flowchart to show an operation example of a control section of the portable wireless device in the first embodiment of the invention.

FIG. 1 is a block diagram to show the configuration of the main part of an electric circuit of a portable wireless device in a first embodiment. FIG. 2 is a front view in a lateral spread state of a housing to show the physical configuration of the portable wireless device shown in FIG. 1. FIG. 3 is a Smith chart to represent an example of the impedance characteristic in a specific part of the portable wireless device shown in FIG. 1. FIG. 4 is a Smith chart to represent an example of the impedance characteristic in a specific part of the portable wireless device shown in FIG. 1. FIG. 5 is a Smith chart to represent an example of the characteristic concerning impedance matching in a specific part of the portable wireless device shown in FIG. 1. FIG. 6 is a flowchart to show an operation example of a control section of the portable wireless device shown in FIG. 1.

The portable wireless device shown in FIGS. 1 and 2 is a portable wireless device including a function for receiving digital TV broadcast (DTV) like one-segment broadcasting. As a specific example of the portable wireless device, a mobile telephone terminal including a one-segment broadcasting reception function can be assumed. However, in FIG. 1, the configuration other than components involved in the reception function of digital TV broadcast is not shown.

Referring to FIG. 1, a mobile telephone terminal 1 includes an antenna 10, an input path changeover switch 11, an impedance matching section 12, a low noise amplifier (LNA) 13, an impedance matching section 14, an output path changeover switch 15, a DTV tuner module 16, a complex conjugate matching section 17, a low noise amplifier (LNA) 18, an impedance matching section 19, a form change detection section 20, and a control section 21.

The antenna 10 has a function of receiving a radio wave of a predetermined wireless frequency band (470 to 770 MHz) where digital TV broadcast is conducted. This means that the antenna receives a wireless signal of a digital TV broadcast signal, etc. The antenna 10 is formed as a housing dipole antenna using a housing of the portable wireless device as an antenna element, as described later. The housing of the portable wireless device can be folded and the antenna 10 is used to receive a radio wave in any state of a state in which the housing is opened and a state in which the housing is closed. The characteristic impedance of the antenna 10 is designed so as to become almost a stipulated impedance (50Ω) in all range of the operating frequency band (470 to 770 MHz). When the housing is closed, the characteristic impedance of the antenna 10 becomes a value slightly shifting from the stipulated impedance (50Ω).

The DTV tuner module 16 is provided for processing a high frequency signal of digital TV broadcast obtained as the antenna 10 received a predetermined radio wave and acquiring information of target content (the content of a broadcast program).

To enhance the reception sensitivity when receiving digital TV broadcast, the low noise amplifier 13 and the low noise amplifier 18 are provided between the antenna 10 and input of the DTV tuner module 16. The low noise amplifier 13 and the low noise amplifier 18 have different impedance characteristic.

The signal path through which a high frequency signal passes between the antenna 10 and the input of the DTV tuner module 16 is separated into two channels between the input path changeover switch 11 and the output path changeover switch 15; the low noise amplifier 13 is connected to one signal path and the low noise amplifier 18 is connected to the other signal path.

The control section 21 switches the selection state of the input path changeover switch 11 and the output path changeover switch 15, whereby the signal paths of the two channels can be used selectively. Specifically, if the characteristic impedance of the antenna 10 changes with form change in the actual use state of the portable wireless device 1, the signal paths of the two channels are switched, whereby optimum impedance matching with a small loss is realized.

To detect form change in the actual use state of the portable wireless device 1, the form change detection section 20 is provided. The form change detection section 20 detects form change of the housing of the portable wireless device 1 and at least distinguishes between a state in which the housing is open and a state in which the housing is closed and gives a signal indicating the result to the control section 21.

The control section 21 switches a signal SG1 for controlling the input path changeover switch 11 and the output path changeover switch 15 based on at least the form change signal output from the form change detection section 20. The control section 21 can be implemented as a microcomputer, for example.

The control section 21 may detect the actual reception state of the digital TV broadcast based on a signal output by the DTV tuner module 16 and may switch the signal SG1 for controlling the input path changeover switch 11 and the output path changeover switch 15 based on the reception state of the digital TV broadcast together with the form change signal. The DTV tuner module 16 has a reception circuit for performing reception processing of tuning processing of selecting a signal of a frequency band used with DTV contained in a high frequency signal from the antenna 10, demodulation processing of demodulating the signal of the frequency band selected in the tuning processing, and the like. The reception processing result is sent to the control section 21 as a reception signal.

The input path changeover switch 11 is a switch that can switch in accordance with the external control signal (SG1); it can switch a state in which a common terminal 11a and a terminal 11b are electrically connected and a state in which the common terminal 11a and a terminal 11c are electrically connected.

The output path changeover switch 15 is a switch that can switch in accordance with the external control signal (SG1); it can switch a state in which a common terminal 15a and a terminal 15b are electrically connected and a state in which the common terminal 15a and a terminal 15c are electrically connected.

As a representative control mode, in a state in which the form change detection section 20 detects a state in which the housing is open, the input path changeover switch 11 switches to the connecting state of the common terminal 11a and the terminal 11b and at the same time, the output path changeover switch 15 switches to the connecting state of the common terminal 15a and the terminal 15b. When the form change detection section 20 detects a state in which the housing is closed, the input path changeover switch 11 switches to the connecting state of the common terminal 11a and the terminal 11c and at the same time, the output path changeover switch 15 switches to the connecting state of the common terminal 15a and the terminal 15c.

A line 51 forming a feeding path of the antenna 10 is connected to the common terminal 11a of the input path changeover switch 11, as shown in FIG. 1. The terminal 11b of the input path changeover switch 11 is connected to input of the impedance matching section 12 through a line 52, and output of the impedance matching section 12 is connected to an input end of the low noise amplifier 13 through a line 53. An output end of the low noise amplifier 13 is connected to input of the impedance matching section 14 through a line 54 and output of the impedance matching section 14 is connected to the terminal 15b of the output path changeover switch 15 through a line 55.

The terminal 11c of the input path changeover switch 11 is connected to input of the complex conjugate matching section 17 through a line 56 and output of the complex conjugate matching section 17 is connected to an input end of the low noise amplifier 18 through a line 57. An output end of the low noise amplifier 18 is connected to input of the impedance matching section 19 and output of the impedance matching section 19 is connected to the terminal 15c of the output path changeover switch 15 through a line 59.

Therefore, in a state in which the input path changeover switch 11 connects the common terminal 11a and the terminal 11b and the output path changeover switch 15 connects the common terminal 15a and the terminal 15b (a state in which the housing is open), the high frequency signal provided by a radio wave received by the antenna 10 is transmitted to input of the DTV tuner module 16 through the line 51, the input path changeover switch 11, the line 52, the impedance matching section 12, the line 53, the low noise amplifier 13, the line 54, the impedance matching section 14, the line 55, and the output path changeover switch 15.

On the other hand, in a state in which the input path changeover switch 11 connects the common terminal 11a and the terminal 11c and the output path changeover switch 15 connects the common terminal 15a and the terminal 15c (a state in which the housing is closed), the high frequency signal provided by a radio wave received by the antenna 10 is transmitted to input of the DTV tuner module 16 through the line 51, the input path changeover switch 11, the line 56, the complex conjugate matching section 17, the line 57, the low noise amplifier 18, the line 58, the impedance matching section 19, the line 59, and the output path changeover switch 15.

The low noise amplifier 13 is a circuit element provided by integrating (packaging) a low noise amplification circuit 13a and an impedance matching section 13b connected to input of the low noise amplification circuit, and input impedance of the low noise amplifier 13 is matched to the stipulated impedance (50Ω) by the action of the impedance matching section 13b.

The impedance matching section 12 is a circuit for matching so that the impedance of the antenna 10 viewed from the input of the low noise amplifier 13 becomes the stipulated impedance (50Ω). The impedance matching section 14 connected to the output of the low noise amplifier 13 is a circuit for matching so that the impedance of the output of the low noise amplifier 13 viewed from the line 55 connected to input of the DTV tuner module 16 becomes the stipulated impedance (50Ω).

On the other hand, the complex conjugate matching section 17 connected to input of the low noise amplifier 18 is a circuit for matching the impedance of the antenna 10 and the input impedance of the low noise amplifier 18 to complex conjugate impedance. The impedance matching section 19 connected to output of the low noise amplifier 18 is a circuit for matching so that the impedance of the output of the low noise amplifier 18 viewed from the line 59 connected to the input of the DTV tuner module 16 becomes the stipulated impedance (50Ω).

In the description of the embodiment, the impedance matching sections 12, 14, and 19 match the impedance to the stipulated impedance, 50Ω, by way of example, but the embodiment is not limited to it since it is assumed that the input end of the reception circuit contained in the DTV tuner module 16 is 50Ω. This means that the impedance matching section may match the impedance to the input impedance of the reception circuit.

The housing of the portable wireless device 1 shown in FIG. 1 is made up of a lower housing 104 and an upper housing 105 into which the housing is separated and a hinge part 106 for joining them in a deformable state. Therefore, the housing is of a deformable structure.

Specifically, the hinge part 106 is provided with a metal hinge member 102 and a metal hinge member 103 of moving members. The metal hinge member 102 joins the upper housing 105 and the hinge part 106 in a relatively rotatable state with the position of an axis indicated by X in FIG. 2 as the center. The metal hinge member 103 joins the hinge part 106 and the lower housing 104 in a relatively rotatable state with the position of an axis indicated by Y in FIG. 2 as the center.

Therefore, the housing can be deformed in the left-right direction and the up and down direction in the figure. That is, the upper housing 105 is rotated with the axis X as the center from the lateral spread state (an open state in which the long side of the lower housing 104 and the long side of the upper housing 105 are adjacent), whereby the housing can be deformed in a state in which the upper housing 105 overlaps the lower housing 104 (closed state). The hinge part 106 and the upper housing 105 are rotated with the axis Y as the center from the state in which the upper housing 105 overlaps the lower housing 104, whereby the housing can also be deformed in a longitudinal spread state in which the short side of the lower housing 104 and the short side of the upper housing 105 are adjacent to form an elongated shape.

The form change detection section 20 shown in FIG. 1 detects form change of the housing a predetermined sensor or switch and distinguishes between the closed state in which the lower housing 104 and the upper housing 105 overlap and the open state (lateral spread or longitudinal spread state). To adopt a housing having deformation freedom of two axes as shown in FIG. 2, the form change detection section 20 may be configured so as to distinguish between the lateral spread state and the longitudinal spread state and detect each state.

As shown in FIG. 2, a circuit board 112 is provided on the upper housing 105 and a circuit board 107 is provided on the lower housing 104; a circuit on the circuit board 112 and a circuit on the circuit board 107 are electrically connected to each other through a flexible connection cable 113. For example, a circuit concerning a display function, etc., is mounted on the circuit board 112. Circuit elements other than the antenna 10, of components of the electric circuit shown in FIG. 1 and other necessary circuit elements are mounted on the circuit board 107.

The circuit on the circuit board 107 of the upper housing 105 and the metal hinge member 103 are electrically connected through a feeding section 108 formed of a conductor, the metal hinge member 103 and the metal hinge member 102 are electrically connected to each other through an antenna element 110, and the metal hinge member 102 and an antenna element 111 through a feeding section 109 formed of a conductor. That is, the antenna element 111, the metal hinge member 102 through the feeding section 109, the antenna element 110, the metal hinge member 103, and the circuit board 107 via the feeding section 108 are electrically connected, and each of the components function as a part of the dipole antenna. In the lower housing 104, an antenna element 114 is disposed at a position opposed to the hinge part 106 through the circuit board 107. The antenna element 114 is electrically connected to the circuit board 107 through a feeding section 115.

The antenna 10 shown in FIG. 1 is a housing dipole antenna of a structure as shown in FIG. 2 and thus the impedance of the antenna 10 changes in a state in which the housing is open and a state in which the housing is closed. When the impedance of the antenna 10 changes, the matching state of the impedance in the transmission path of the high frequency signal between the antenna 10 and the input of the DTV tuner module 16 changes and there is a possibility that the matching loss may increase or the reception state may be degraded. Then, the circuit as shown in FIG. 1 is configured to normally maintain the matching state, suppress a reflection wave, and decrease in an increase in the loss with matching even if the impedance of the antenna 10 changes.

The impedance matching operation in the transmission path of the high frequency signal of the portable wireless device 1 shown in FIG. 1 will be discussed with reference to Smith charts of FIGS. 3 to 5. In FIGS. 3 to 5 like general Smith charts, the horizontal axis represents the real number component of a complex reflection coefficient (S11) changing in response to the impedance, the vertical axis represents the imaginary number component of the complex reflection coefficient (S11), on each circle, the real number component (resistance component) corresponds to a given impedance, and on each curve curved up and down, the imaginary number component (reactance component) corresponds to a given impedance. The center point of each Smith chart corresponds to impedance of 50Ω.

An impedance characteristic 31 of a circle shown in FIG. 3 represents an approximate fluctuation range of input impedance of the low noise amplifier 13 in all range of the frequency band (470 to 770 MHz) used to receive digital TV broadcast (DTV) when the housing of the wireless communication unit 1 is open. That is, the input impedance of the low noise amplifier 13 is close to the stipulated impedance (50Ω) by the action of the impedance matching section 13b in the low noise amplifier 13. When the housing of the portable wireless device 1 is open, the impedance of the antenna 10 becomes a characteristic almost matching 50Ω over all range of the used frequency band (470 to 770 MHz). Therefore, the impedance is slightly adjusted, whereby the impedance matching section 12 can match an impedance characteristic 43 of the impedance of the antenna to an impedance characteristic 42 of the input impedance of the low noise amplifier 13 and the complex reflection coefficient can be made close to "1" to decrease a reflection wave. Thus, the impedance matching section 12 matches the impedance of the line 53 to 50Ω so that a reflection wave does not occur between the antenna 10 and the input of the low noise amplifier 13, as shown in FIG. 5(a).

On the other hand, when the housing of the portable wireless device 1 is closed, the impedance of the antenna 10 largely shifts from the stipulated impedance (50Ω) and the characteristic of the used frequency band (470 to 770 MHz) becomes like an impedance characteristic 44 shown in FIG. 5(b), for example. Thus, for example, if an attempt is made to match the impedance to 50Ω, by adjusting the impedance matching section 12, an increase in the loss with the matching is not avoided.

Then, when the impedance of the antenna 10 largely shifts from the stipulated impedance (50Ω) because of change in the use mode, to change the impedance matching method, the signal path is switched and the complex conjugate matching section 17, the low noise amplifier 18, and the impedance matching section 19 are used in place of the impedance matching section 12, the low noise amplifier 13, and the impedance matching section 14.

An impedance characteristic 32 shown in FIG. 4 represents an approximate fluctuation range of input impedance of the low noise amplifier 18 in all range of the frequency band (470 to 770 MHz) used to receive digital TV broadcast (DTV) when the housing of the portable wireless device 1 is closed. That is, the input impedance of the low noise amplifier 18 largely shifts from the stipulated impedance (50Ω).

The complex conjugate matching section 17 connected to the input of the low noise amplifier 18 matches the impedance to an impedance characteristic 46 so that the impedance characteristic 44 of the impedance of the antenna 10 becomes an impedance characteristic 45 of the input impedance of the low noise amplifier 18 (corresponding to the impedance characteristic 32 in FIG. 4) and complex conjugate impedance, as shown in FIG. 5(b).

For example, if input impedance Z1 of the low noise amplifier 18 corresponding to the impedance characteristic 45 is represented by a complex number of (Z1=a+jb), the impedance characteristic 46 is determined so as to become impedance Z2 with the relation of complex conjugate with Z1 (Z2=a−jb). That is, the impedances Z1 and Z2 have the relation of complex conjugate and thus the effect of the reactance component of impedance (the imaginary number component of the reflection coefficient) cab be canceled out and while an increase in the loss with the matching is suppressed, the impedance can be matched so that the reflection wave decreases. Therefore, if the housing is closed and the impedance of the antenna 10 largely shifts from 50Ω, the loss with the matching occurring between the antenna 10 and the DTV tuner module 16 lessens and a good reception state can be realized.

For switching of the signal path of the high frequency signal by switching of the input path changeover switch 11 and the output path changeover switch 15, one-to-one correspondence may be made with the detection result of the form change detection section 20 and control may be performed so as to select the upper signal path shown in FIG. 1 when the housing is open and select the lower signal path shown in FIG. 1 when the housing is closed. However, various possibilities are assumed about the actual use state and thus, even when the housing is closed, the case where a good result is provided if the upper signal path shown in FIG. 1 is selected is also considered.

Then, the control section 21 shown in FIG. 1 may control switching of the signal path considering the actual reception quality as well as the detection result of the form change detection section 20, as shown in FIG. 6. The operation of the control section 21 in this case will be discussed below with reference to FIG. 6.

At step S11, the control section 21 checks whether or not the form change detection section 20 detects form change (housing opening/closing) and if form change is detected, the control section 21 goes to step S12.

At step S12, the control section 21 checks the reception signal output from the DTV tuner module 16, thereby detecting reception quality Q1. As a specific example of the reception quality to be detected, the reception strength (for example, the reception electric field strength) of the high frequency signal input to the DTV tuner module 16, carrier power to noise power ratio C/N (Carrier to Noise ratio), BER (Bit Error Rate) of the reception signal, etc., is assumed.

At step S13, information of the reception quality Q1 before switch detected at step S12 is stored for the later use.

At step S14, the control section 21 switches the signal SG1 to switch the input path changeover switch 11 and the output path changeover switch 15 in accordance with the detection result of the form change detection section 20 at step S11. That is, if opening the housing is detected, switching is performed so that the input path changeover switch 11 connects the common terminal 11a and the terminal 11b and the output path changeover switch 15 connects the common terminal 15a and the terminal 15b. If closing the housing is detected, switching is performed so that the input path changeover switch 11 connects the common terminal 11a and the terminal 11c and the output path changeover switch 15 connects the common terminal 15a and the terminal 15c.

At step S15, the control section 21 again checks the reception signal output from the DTV tuner module 16, thereby detecting reception quality Q2 after switch.

At step S16, the control section 21 makes a comparison between the reception quality Q2 after switch and the reception quality Q1 before switch. If condition of "Q2>Q1" is satisfied (the reception quality is improved by the switch), the processing is completed; if the condition is not satisfied (the reception quality is worsened by the switch), the process goes to step S17.

At step S17, the control section 21 controls the signal SG1 and restores the state to the state before execution of step S14. That is, if closing the housing is detected, the state is restored to the state in which the input path changeover switch 11 connects the common terminal 11a and the terminal 11b and the output path changeover switch 15 connects the common terminal 15a and the terminal 15b. If opening the housing is detected, the state is restored to the state in which the input path changeover switch 11 connects the common terminal 11a and the terminal 11c and the output path changeover switch 15 connects the common terminal 15a and the terminal 15c.

According to the portable wireless device of the embodiment, if the housing dipole antenna is included, it is made possible to change the signal path in response to the open or closed state of the housing and the loss of matching can be largely decreased.

Second Embodiment

Figure 7:
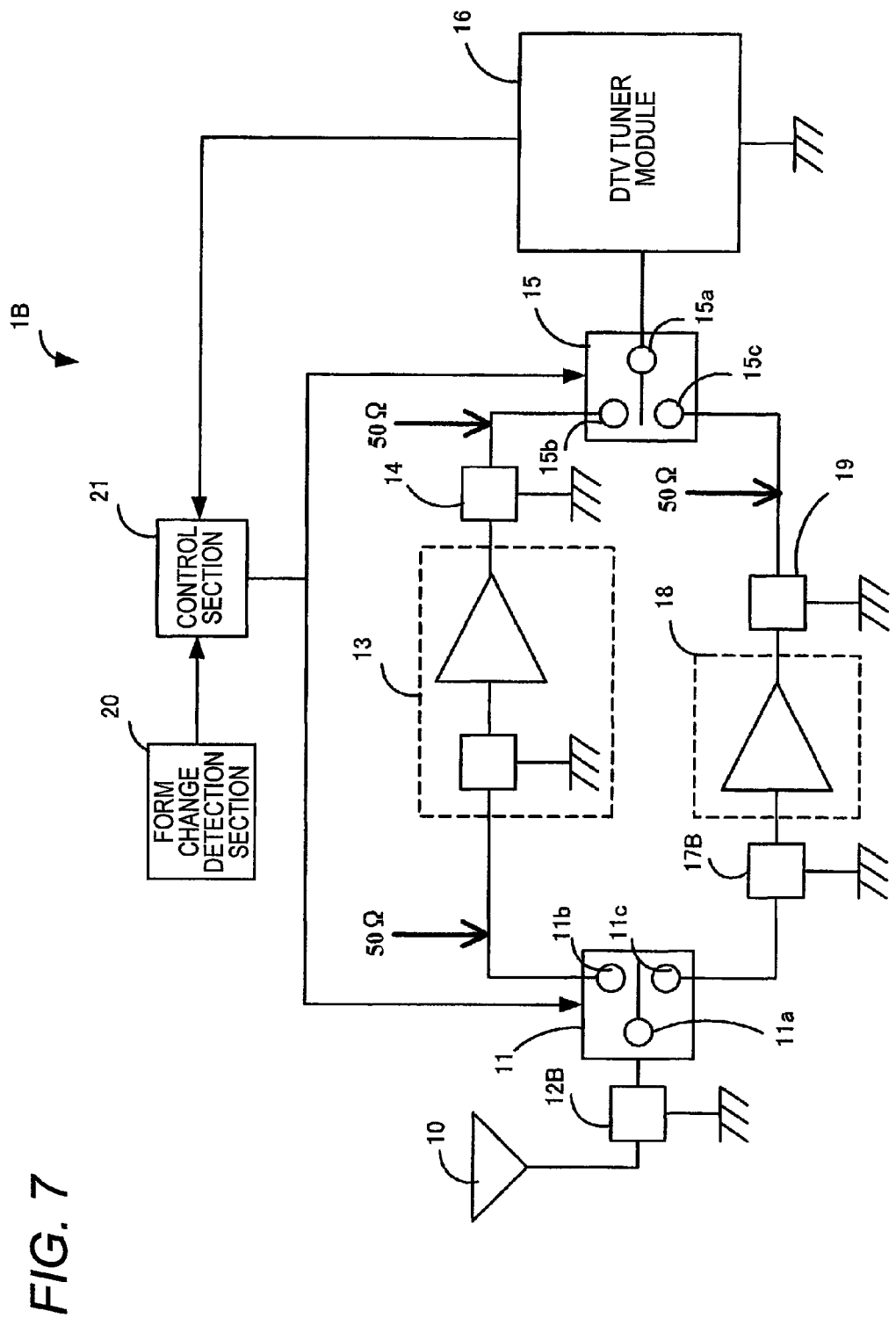
FIG. 7 is a block diagram to show the configuration of the main part of an electric circuit of a portable wireless device in a second embodiment of the invention.
Figure 8:
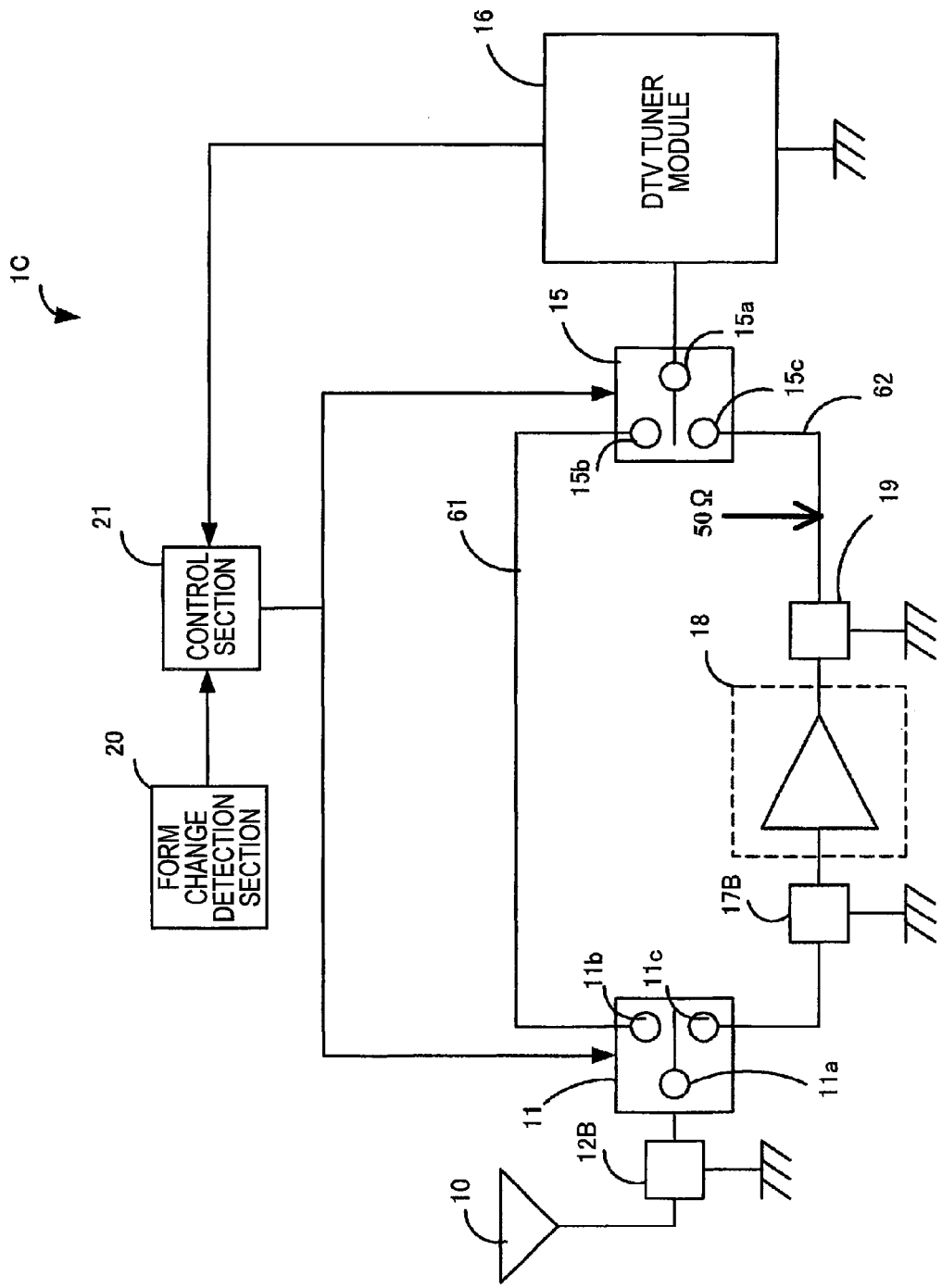
FIG. 8 is a block diagram to show a modified example of the configuration of the portable wireless device in the second embodiment of the invention.

FIG. 7 is a block diagram to show the configuration of the main part of an electric circuit of a portable wireless device in a second embodiment. FIG. 8 is a block diagram to show a modified example of the configuration of the portable wireless device shown in FIG. 7.

The second embodiment is a modified example of the first embodiment. Elements corresponding to those in FIG. 1 are denoted by the same reference numerals in FIGS. 7 and 8. The main change will be discussed below: The description on the same configuration and operation as shown in FIG. 1 is omitted or is simplified in FIGS. 7 and 8.

In a portable wireless device 1B shown in FIG. 7, an impedance matching section 12B is connected between an antenna 10 and a common terminal 11a of an input path changeover switch 11, and a terminal 11b of the input path changeover switch 11 and input of a low noise amplifier 13 are directly connected. That is, the impedance matching section 12B provided in place of the impedance matching section 12 in FIG. 1 is connected to a position closer to the antenna 10 as compared with the portable wireless device 1 of the first embodiment. The impedance matching section 12B has a characteristic of matching impedance to 50Ω when a housing is open (when the impedance is stipulated impedance 50Ω).

The function of a complex conjugate matching section 17B connected to input of a low noise amplifier 18 is equivalent to that of the complex conjugate matching section 17 shown in FIG. 1; however, the impedance matching section 12B exists between the antenna 10 and the input path changeover switch 11 and thus the characteristic is slightly changed considering the effect of the impedance matching section 12B.

The impedance matching section 12B is placed close to the antenna 10 as shown in FIG. 7, whereby the loss of matching can be largely decreased. It is made possible to conduct circuit design more easily.

On the other hand, the configuration of a mobile radio 1C shown in FIG. 8 is made simpler than the configuration shown in FIG. 7; the low noise amplifier 13 and impedance matching section 14 are omitted. That is, a first line 61 between a terminal 11b of an input path changeover switch 11 and a terminal 15b of an output path changeover switch 15 is a simple line (impedance is 50Ω) only. The configuration of a second line 62 to which a complex conjugate matching section 17B, a low noise amplifier 18, and an impedance matching section 19 are connected is the same as the configuration in FIG. 7.

The configuration of the portable wireless device 1C as in FIG. 8 is adopted, so that the loss of matching can be largely decreased. The circuit configuration can be simplified.

Third Embodiment

Figure 9:
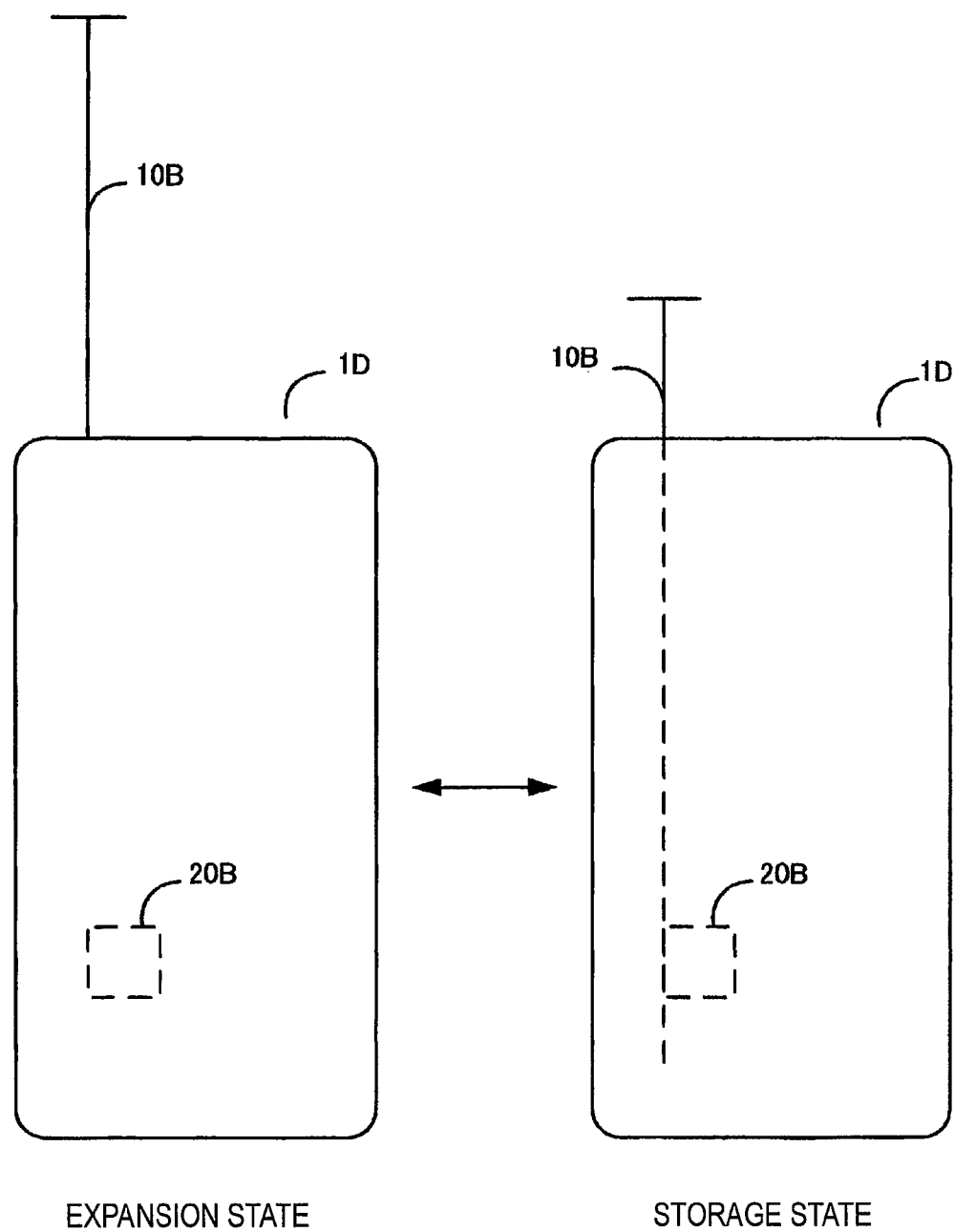
FIG. 9 is a front view to show an example of a portable wireless device with an antenna that can be expanded/stored in a third embodiment of the invention.

FIG. 9 is a front view to show an example of a portable wireless device with an antenna that can be expanded/stored in a third embodiment of the invention. The third embodiment is a modified example of the first or second embodiment. The difference from the first or second embodiment will be discussed below; the third embodiment differs from the first or second embodiment mainly in that an antenna 10B that can be expanded/stored is used in place of the antenna 10 and that a form change detection section 20B for detecting form change caused by expansion/storage of the antenna 10B is included in place of the form change detection section 20.

In the first embodiment and the second embodiment described above, the case where the housing dipole antenna is adopted as the antenna 10 is assumed and thus the impedance of the antenna 10 largely changes with deformation of the housing (opening or closing). On the other hand, to use a whip antenna, in the antenna 10B where form change of an expansion state and a storage state occurs as shown in FIG. 9, for example, the state of various conductive materials existing on the periphery of the antenna 10B changes with the form change and thus change occurs in the impedance.

Therefore, also in a portable wireless device 1D using the antenna 10B as shown in FIG. 9, the configuration as shown in FIG. 1, FIG. 7, FIG. 8 is applied, whereby worsening of the reception state with impedance change of the antenna can be suppressed.

The portable wireless device shown in FIG. 9 is provided with a form change detection section 20B for detecting which of the expansion state and the storage state the antenna 10B is in. Therefore, the form change detection section 20B may be used in place of the form change detection section 20 shown in FIG. 1.

In the configurations shown in FIG. 1, FIG. 7, and FIG. 8, only two types of form change of the portable wireless device are assumed and thus only two types of signal paths of a high frequency signal that can be switched are provided. However, to use a housing where three types of form change of lateral spread, longitudinal spread, and closed state are possible as shown in FIG. 2, for example, there is a possibility that three types of impedance change may occur. Therefore, in such a case, three or more types of signal paths that can be switched may be provided and a signal path where optimum impedance matching is possible may be selected from among the three types of signal paths conforming to form change.

According to the portable wireless device of the embodiment, if an antenna that can be expanded/stored is included, it is made possible to change the signal path in response to the expansion or contract state of the antenna and the loss of matching can be largely decreased.

While the invention has been described in detail with reference to the specific embodiments, it will be obvious to those skilled in the art that various changes and modifications can be made without departing from the spirit and the scope of the invention.

This application is based on Japanese Patent Application No. 2008-198156 filed on Jul. 31, 2008, which is incorporated herein by reference.

INDUSTRIAL APPLICABILITY

As described above, the portable wireless device of the invention can be applied to a mobile telephone terminal, etc., for example, and is useful for maintaining any desired impedance matching state and realizing the preferred reception state without largely increasing the loss accompanying matching in a circuit for receiving digital TV broadcast in a situation in which the impedance of the antenna changes with form change like opening or closing because of deformation of the housing or expansion/storage of the antenna.

The invention claimed is:

1. A portable wireless device, comprising:
   an antenna that receives a predetermined wireless signal;
   a reception circuit that performs a predetermined reception processing for a high frequency signal received by the antenna;
   a first reception system that electrically connects the antenna and the reception circuit in a first configuration;
   a second reception system that electrically connects the antenna and the reception circuit in a second configuration;
   a form detection section that detects a form of the antenna or a form of a housing; and
   a switch section that selectively switches so as to connect the first reception system or the second reception system to the antenna based on the detection result of the form detection section;
   wherein the first reception system comprises a first low noise amplifier that amplifies the high frequency signal when the first reception system is connected to the antenna in the first configuration; and
   the second reception system comprises a second low noise amplifier having a different impedance characteristic from that of the first low noise amplifier, the second low noise amplifier amplifying the high frequency signal when the second reception system is connected to the antenna in the second configuration.

2. The portable wireless device as claimed in claim 1, as the switch section, comprising a first switch section placed between the antenna and the first low noise amplifier and the second low noise amplifier that selectively switches so as to connect an input of the first low noise amplifier or an input of the second low noise amplifier to the antenna based on the detection result of the form detection section; and
   a second switch section placed between the first low noise amplifier and the second low noise amplifier and the reception circuit, the second switch selectively switching so as to connect output of the first low noise amplifier or output of the second low noise amplifier to input of the reception circuit based on the detection result of the form detection section.

3. The portable wireless device as claimed in claim 2, comprising:
   a first impedance matching section placed between the first switch section and the first low noise amplifier, the first impedance matching section matching an input impedance of the first low noise amplifier to an input impedance of the reception circuit.

4. The portable wireless device as claimed in claim 2, wherein the second reception system comprises a complex conjugate matching section placed between the first switch section and an input of the second low noise amplifier, the complex conjugate matching section matching the impedance of the antenna and impedance of the second low noise amplifier to a complex conjugate impedance.

5. The portable wireless device as claimed in claim 2, wherein the second reception system comprises a second impedance matching section matching an output impedance of the second low noise amplifier to the input impedance of the reception circuit between output of the second low noise amplifier and the second switch section.

6. The portable wireless device as claimed in claim 2, wherein the first reception system comprises a third impedance matching section matching an output impedance of the first low noise amplifier to the input impedance of the reception circuit between output of the first low noise amplifier and the second switch section.

7. The portable wireless device as claimed in claim 2, further comprising:
   a reception state determination section that determines whether or not the reception state is good based on the result of the reception processing, wherein the first switch section and the second switch section switch based on the determination result of the reception state determination section.

8. The portable wireless device as claimed in claim 1, wherein the form detection section detects either an expansion state or a storage state of the antenna.

9. The portable wireless device as claimed in claim 1, wherein a first housing and a second housing can be opened and closed;
   wherein the antenna is a dipole antenna containing at least a part of a first circuit board disposed in the first housing and a part of a second circuit board disposed in the second housing, and wherein the form detection section detects either an open state or a closed state of the housing.

10. The portable wireless device as claimed in claim 1, wherein the predetermined wireless signal contains a digital TV broadcast signal.

11. A portable wireless device, comprising:
    an antenna that receives a predetermined wireless signal;
    a reception circuit that performs a predetermined reception processing for a high frequency signal received by the antenna;
    a first reception system that electrically connects the antenna and the reception circuit;
    a second reception system that electrically connects the antenna and the reception circuit;
    a form detection section that detects a form of the antenna or a form of a housing;
    a first switch section placed between the antenna and the first reception system and the second reception system, the first switch selectively switching so as to connect input of the first reception system or input of the second reception system to the antenna based on the detection result of the form detection section;
    a second switch section placed between the first reception system and
    the second reception system and the reception circuit, the second switch section selectively switching so as to connect an output of the first reception system or an output of the second reception system to an input of the reception circuit based on the detection result of the form detection section; and
    a first impedance matching section placed between the antenna and
    the first switch section, the first impedance matching section matching an impedance of the antenna to an input impedance of the reception circuit;
    wherein the second reception system comprises a second low noise amplifier that amplifies the high frequency signal.

12. The portable wireless device as claimed in claim 11, wherein the first reception system comprises a first low noise amplifier having a different impedance characteristic from that of the second low noise amplifier, the first low noise amplifier amplifying the high frequency signal.

13. The portable wireless device as claimed in claim 11, wherein the second reception system comprises a complex conjugate matching section placed between the first switch section and an input of the second low noise amplifier, the complex conjugate matching section matching the impedance of the antenna and impedance of the second low noise amplifier to complex conjugate impedance.

14. The portable wireless device as claimed in claim 11, wherein the second reception system comprises a second impedance matching section matching an output impedance of the second low noise amplifier to the input impedance of the reception circuit between output of the second low noise amplifier and the second switch section.

15. The portable wireless device as claimed in claim 11, wherein the first reception system comprises a third impedance matching section matching an output impedance of the first low noise amplifier to the input impedance of the reception circuit between output of the first low noise amplifier and the second switch section.

16. The portable wireless device as claimed in claim 11, wherein the form detection section detects either an expansion state or a storage state of the antenna.

17. The portable wireless device as claimed in claim 11, wherein a first housing and a second housing can be opened and closed;

wherein the antenna is a dipole antenna containing at least a part of a first circuit board disposed in the first housing and a part of a second circuit board disposed in the second housing, and wherein the form detection section detects either an open state or a closed state of the housing.

18. The portable wireless device as claimed in claim 11, further comprising:

a reception state determination section that determines whether or not the reception state is good based on the result of the reception processing, wherein the first switch section and the second switch section switch based on the determination result of the reception state determination section.

19. The portable wireless device as claimed in claim 11, wherein the predetermined wireless signal contains a digital TV broadcast signal.

* * * * *